March 2, 1954  J. C. MARSALA  2,671,207
LICENSE PLATE ILLUMINATING SYSTEM
Filed Aug. 16, 1951  2 Sheets-Sheet 1
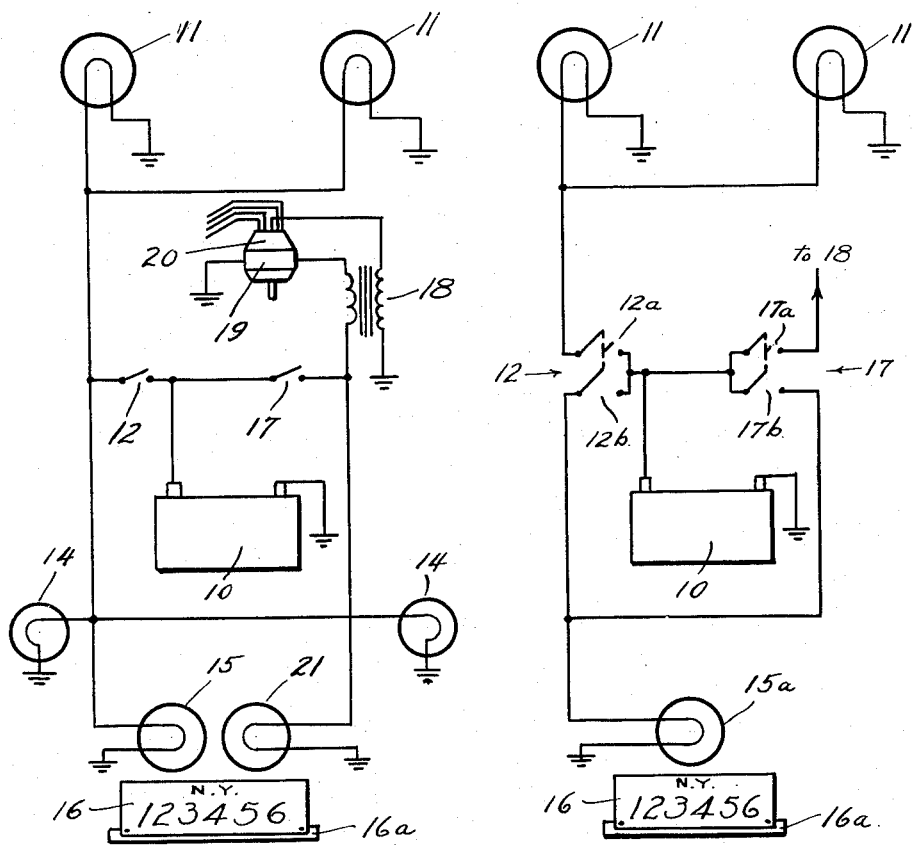
INVENTOR
Joseph C. Marsala,
BY Hall & Houghton
ATTORNEYS March 2, 1954     J. C. MARSALA     2,671,207
LICENSE PLATE ILLUMINATING SYSTEM Filed Aug. 16, 1951     2 Sheets-Sheet 2

INVENTOR
Joseph C. Marsala,
BY Hall + Houghton
ATTORNEYS

Patented Mar. 2, 1954

2,671,207

UNITED STATES PATENT OFFICE 2,671,207

LICENSE PLATE ILLUMINATING SYSTEM

Joseph C. Marsala, Watertown, N. Y.

Application August 16, 1951, Serial No. 242,099

10 Claims. (Cl. 340—54)

This invention relates to the illumination of license or registration plates of automotive vehicles and aims generally to provide a license plate illuminating system to insure against a hit-and-run driver or other law violator escaping detection by turning off his lights while fleeing the scene of the accident or other violation.

Particular objects of the invention severally and interdependently are to provide an illuminated license plate installation in which at least the rear license plate is illuminated whenever the light switch of the vehicle is closed and also whenever the vehicle is operating. The invention resides in the new features and combinations herein disclosed and claimed, and the present application is in part a continuation of my prior application Ser. No. 738,381, filed March 3, 1947.

At the present time speeders, hit and run drivers, and other law violators frequently escape detection, especially at night, by extinguishing their car lights while leaving the scene of the accident or law violation. Others trying to escape apprehension in stolen cars also resort to this practice.

The present invention, by simple arrangements described in detail hereinafter is designed to insure illumination of the number plates or rear number plate of the automobile, not only when the "light" switch is in "on" position, but whenever the car is being driven. This novel concept of illuminating the publicly exhibited license or registration plate at all times except when the car is parked with the lights out, is preferably practiced by arranging that the rear license plate be illuminated whenever the engine ignition switch is in "on" position, but in its broader aspects may be otherwise effected. The small amount of electricity required to illuminate the license plate or plates while the car is being operated will not run down the car battery, as the only time this illumination cannot be shut off is when the car generator is operating and so charging the battery.

In the accompanying drawings of illustrative embodiments of the invention

Fig. 1 is a schematic diagram of an automobile ignition and lighting system embodying one form of the invention.

Figs. 2 through 4 are similar schematic diagrams showing modified arrangements.

Figure 4:
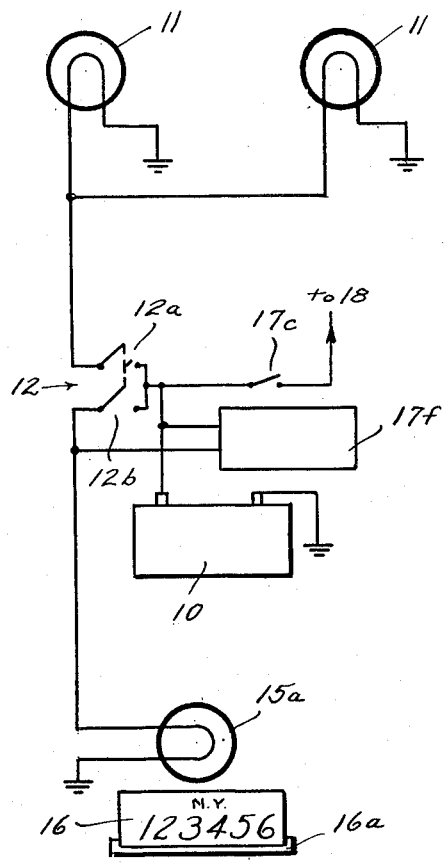
Figure 5:
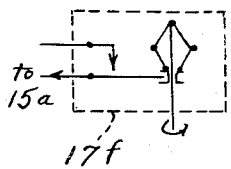
Figure 6:
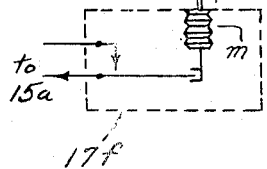
Figure 7:
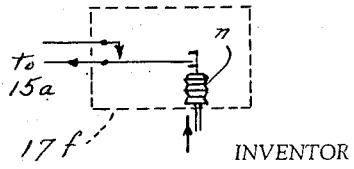

Figs. 5, 6, and 7 are diagrammatic representations of typical motion responsive switches contemplated in the arrangement of Fig. 4.

In each of the illustrative figures the improvement of the present invention is shown applied to a typical automobile electrical system that is to be considered illustrative and not restrictive of the invention. Such typical system comprises a battery 10 charged in the usual way by a generator (not shown), headlights 11 carried at the front of the vehicle for illuminating the road, and a light switch 12 for energizing the headlights from the vehicle battery 10. The conventional circuit also usually comprises additional lights automatically or selectively illuminated by the light control switch 12, exemplified in Fig. 1 by the dual tail lights 14 and rear number plate illuminating light 15 conventionally arranged adjacent the rear plate holder 16a as required by the laws of most jurisdictions. As indicated in the drawings the returns of all circuits are usually grounded to the automobile chassis.

The conventional electrical system also comprises an ignition switch 17 controlling the supply of current from the battery 13 to the ignition system of the automobile. Such ignition system usually comprises an ignition coil 18 having its primary circuit energized from switch 17 and completed through the distributor breaker points 19 to ground, and its secondary circuit supplying high voltage current through the conventional distributor rotor means 20 and the associated spark plug leads to the spark plugs of the engine (not shown).

In the first embodiment of the present invention Fig. 1, a second rear number plate light 21 is positioned to illuminate the rear number plate 16, and is energized through the ignition switch 17. Since the ignition switch is always in the "on" position whenever the engine is running, this simple but novel provision insures the illumination of the license plate at all times when the engine is running, which itself is a novel concept for aiding in law enforcement. The separation of the ignition switch energized number plate lamp circuit 21 from the light switch controlled number plate lamp circuit 15 insures that closing of the light switch 12 will not short circuit the ignition switch 17 and energize the automobile ignition 18—20.

In the form of Fig. 2 a different mode is employed for effecting this last mentioned provision. In this arrangement the light switch 12 comprises separate contact means 12a for the headlight circuit and 12b for the number plate light circuit. The contact means 12b is ganged to operate with but is separate from the other contact means of the switch 12 for separately closing the circuit from the battery to the number plate light 15a when the light switch is closed;

and in this arrangement the ignition switch 17 also has a set of contacts 17b separate from the ignition circuit contacts 17a but ganged to close therewith when the ignition switch is closed, the contacts 15b and 17b each closing a circuit from the battery to the single license plate illuminating lamp 15a. By inspection of Fig. 2 it will be seen that closing of the light switch 12a, 12b energizes the vehicle lights including license plate lamp 15a, but does not energize the ignition 18—20 when the ignition switch 17a, 17b is open; also that closing of the ignition switch 17a, 17b energizes the license plate lamp 15a, but that the other lights of the vehicle exemplified by headlights 10 are not illuminated with this arrangement unless the light switch 12a, 12b is closed.

Figure 3:
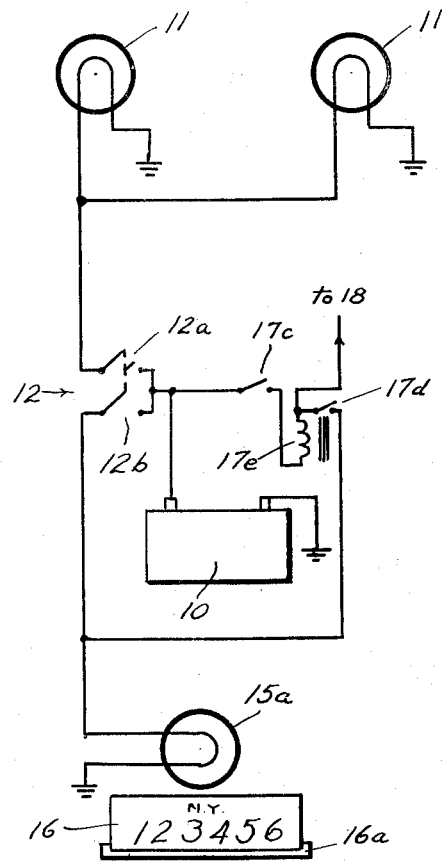

A different arrangement for obtaining the same result is shown in Fig. 3. In this arrangement all the elements are arranged as in Fig. 2 except that the auxiliary number plate lamp switch 17b ganged to close and open with the ignition switch in Fig. 2, is replaced by a relay switch 17d closed by a slow acting relay coil 17e arranged in series in the primary ignition lead between the ignition switch 17c and the connection of the switch 17d thereto. With this arrangement closing of the ignition switch and running of the engine pulse energizes the coil 17e and by virtue of the slow releasing character of the relay 17d, 17e, holds the auxiliary number plate illuminating switch 17d in circuit closing position, opening of the ignition switch 17c of course resulting in opening of the circuit through coil 17e and opening of the auxiliary number plate illuminating switch 17d, the current drawn by lamp 15a through coil 17e and switch 17d being insufficient to maintain the relay switch 17d closed, but being sufficient to aid in the slow release of the switch. If desired other slow release means may be provided and the line from the battery may lead to switch 17d directly or without passing through the coil 17e as will be apparent from Figs. 2 and 4.

Still another mode of practicing the invention is illustrated in Fig. 4. Here again the circuit arrangement is similar to that of Fig. 2, but in this instance the ganged switch 17b of Fig. 2 is replaced by a function responsive switch 17f, that is appropriately associated with any part of the car the condition of which is altered incidental to the running of the engine or the driving of the vehicle. For example as indicated in Fig. 5 the function responsive switch 17f may be a centrifugal switch associated with any part of the engine or driving gear of the automobile that rotates when the motor is running or when the car is being driven, the centrifugal switch closing the number plate lighting circuit 15a when the part is put in motion. Alternatively as indicated in Fig. 6 the function responsive switch may be a vacuum operated switch comprising a collapsible diaphragm m connected to the intake manifold of the automobile engine and closing the number plate light circuit 15a when the engine is started. Or if desired the function responsive switch 17f as shown in Fig. 7 may be a pressure operated switch and may comprise an expansible diaphragm n subjected to pressure from the exhaust manifold or from the oil pump of a positive pressure lubricated engine for closing the circuit of the number plate lamp 15a when the engine is operating.

It will be appreciated that the examples herein set forth are illustrative and not restrictive of the invention which primarily resides in the provision of means for illuminating the publicly exhibited number plate whenever the car is in motion or conditioned for motion as the case may be.

While there have been described what are at present considered preferred embodiments of the invention, it will be obvious to those skilled in the art that minor changes and modifications may be made therein within the scope of the invention. It is therefore to be understood that the exemplary embodiments are illustrative and not limiting in character and that the scope of the invention is defined in the appended claims. All modifications that come within the meaning and range of equivalency of the claims are therefore intended to be included therein.

I claim:

1. An illuminated rear license plate installation for a vehicle having a battery and an ignition switch, said installation comprising a rear license plate holder and an electric lamp associated therewith for illuminating a license plate mounted thereon, and said electric lamp having a circuit for energizing it from the vehicle battery which is switch interrupted only by the opening of the said vehicle ignition switch so that it illuminates said license plate whenever the vehicle ignition switch is closed.

2. An illuminated license plate installation for a vehicle having a battery and an ignition switch, said installation comprising a license plate holder and an electric lamp associated therewith for illuminating a license plate mounted thereon, and said electric lamp having a circuit including said lamp and the vehicle battery, and completed through said vehicle ignition switch and switch interrupted only by opening said ignition switch so that said lamp is energized whenever the vehicle ignition switch is closed.

3. An illuminated license plate installation for a vehicle having a battery, a light switch and an ignition switch, said installation comprising a license plate holder and electric lamp means associated therewith for illuminating a license plate mounted thereon, and said lamp means having two complete lamp energizing circuits one of which is switch interrupted only by the opening of said vehicle ignition switch, and the other of which is switch interrupted only by the opening of said vehicle light switch, so that a license plate mounted on said holder is illuminated whenever either the light switch or the ignition switch is closed.

4. An illuminated license plate installation for a vehicle having a battery, a light switch and an ignition switch, said installation comprising a license plate holder and electric lamp means associated therewith for illuminating a license plate mounted thereon, and said lamp means comprising filament means interposed between a common lead for connection to one pole of the battery and separate leads for connection to the other pole of the battery by the closing of said ignition switch and said light switch, respectively, said common lead and one of said separate leads constituting a complete circuit between the battery and said filament means that is switch interrupted only by opening said ignition switch, and said common lead and the other of said separate leads constituting a second complete circuit between the battery and said filament means switch interrupted only by opening said light switch, so that a license plate mounted on said holder will be illuminated whenever either the light switch or the ignition switch is closed.

5. An illuminated rear license plate installation for a vehicle having a battery and an ignition switch, said installation comprising a rear license plate holder and an electric lamp associated therewith for illuminating a license plate mounted thereon, and said electric lamp having a circuit for energizing said lamp from the vehicle battery that is automatically completed by the closing of the said vehicle ignition switch and switch interrupted only by opening of said vehicle ignition switch so that said lamp illuminates said license plate whenever the vehicle ignition switch is closed.

6. An illuminated license plate installation according to claim 3 in which the light switch controlled circuit for said lamp means is independent of the ignition switch controlled circuit therefor so that closing of the light switch does not render the ignition switch inoperative to deenergize the ignition of the vehicle.

7. An illuminated rear license plate installation for an automotive vehicle, said installation comprising a rear license plate holder and an electric lamp associated therewith for illuminating a license plate mounted thereon, and said electric lamp having a circuit for energizing it which is automatically completed while the vehicle is being driven and which contains no switch operable for preventing such automatic energization.

8. An illuminated rear license plate installation for an automotive vehicle having an engine, said installation comprising a rear license plate holder and an electric lamp associated therewith for illuminating a license plate mounted thereon, and said electric lamp having a circuit for energizing it that is automatically completed while the vehicle engine is operating and that contains no switch operable for preventing such automatic energization.

9. An illuminated rear license plate installation for an automotive vehicle having an engine ignition system, said installation comprising a rear license plate holder and an electric lamp associated therewith for illuminating a license plate mounted thereon and said electric lamp having a circuit for energizing it that is automatically energized while the vehicle ignition system is operating and that contains no switch operable for preventing such automatic energization.

10. An illuminated rear license plate installation for an automotive vehicle having an engine ignition system including an ignition switch, said installation comprising a rear license plate holder and an electric lamp associated therewith for illuminating a license plate mounted thereon and said electric lamp having a circuit for energizing it that is automatically completed by the closing of the said ignition switch and that contains no switch operable for preventing such automatic energization.

JOSEPH C. MARSALA.

References Cited in the file of this patent

UNITED STATES PATENTS

| Number | Name | Date |
|---|---|---|
| 2,439,634 | Robey | Apr. 13, 1948 |
| 2,454,722 | Slamka | Nov. 23, 1948 |

FOREIGN PATENTS

| Number | Country | Date |
|---|---|---|
| 442,442 | Germany | Mar. 29, 1927 |